June 5, 1928.

L. ROUANET 1,672,425

COMBINATION LOCK

Filed March 3, 1927

L. Rouanet
inventor

By: Marks & Clerk
Attys

Patented June 5, 1928.

1,672,425

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

COMBINATION LOCK.

Application filed March 3, 1927, Serial No. 172,492, and in France March 16, 1926.

The invention relates to locking devices including combination locks of the type in which a rod like member is fitted with pins the outer ends of which are held in circular grooves provided in the inner surfaces of rings concentric with the rod, each of the said rings being further provided with an internal longitudinal groove, ending in the circular groove, so as to enable an axial movement of the rod when all the longitudinal grooves have been brought in line opposite the pins, by rotating the rings to the proper relative positions.

The invention has for its object an improved arrangement of the combination lock with the stationary parts of the locking device enabling same to be easily opened or replaced in the closed position.

Accordingly the invention consists in the arrangement of parts hereafter more fully described with reference to the accompanying drawing in which:

One embodiment of the invention is illustrated by way of example in the accompanying drawing, in which.

Figure 1:
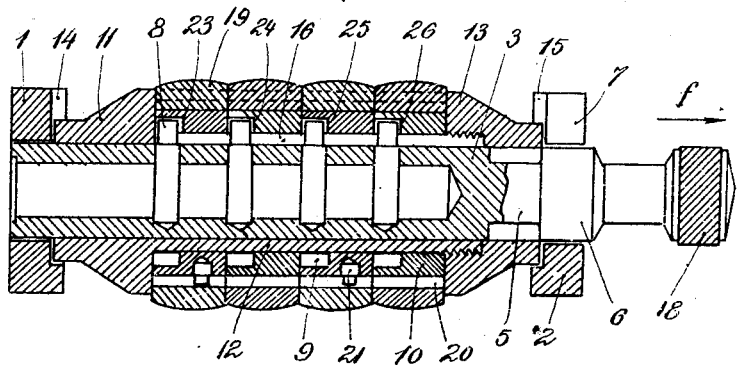
Fig 1 is a sectional view of a combination locking device the rod being in locked position.
Figure 2:
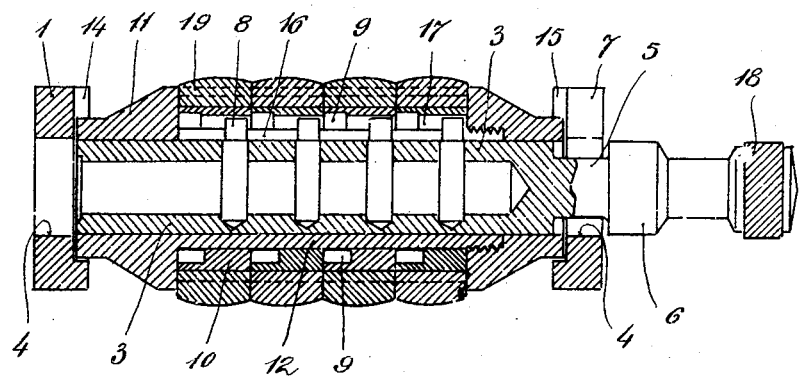
Fig. 2 is a sectional view similar to that of Fig. 1, but with the rod in unlocked position.
Figure 3:
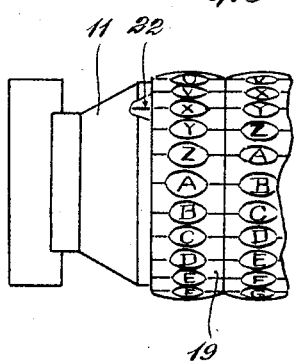
Fig. 3 is a partial plan view of the locking device.
Figure 4:
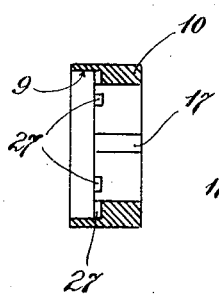
Figs. 4 and 5 show respectively a section and an elevation view of one of the rings according to the invention.
Figure 5:
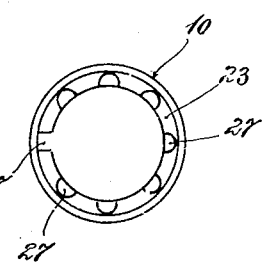

The locking device in the example illustrated has been intended for connecting together two arms or lugs 1 and 2. For this purpose a rod like member 3 passes through the holes 4 in the said arms 1 and 2 and is provided with a portion of reduced diameter 5 and a tightened portion or collar 6 so located that when the rod 3 is disengaged from the arm 1, as in Fig. 2, the portion of reduced diameter 5 is inside the hole 4 in the arm 2. A disengagement slot 7 is provided in the arm 2 and has a width slightly larger than the diameter of the portion 5, but smaller than the diameter of the collar 6. The rod 3 can therefore be removed transversally through the slot 7, when the reduced portion 5 is inside the hole 4 in the arm 2. When the collar 6 is inside the said hole in the arm 2, such transversal movement is prevented, since the diameter of the collar 6 is greater than the width of the slot 7. The longitudinal movement of the rod 3 is restricted by the pins 8 inserted into the said rod 3. The outer end of each of the said pins 8 projects into a circular groove 9 cut in the inside face of each of the rings 10 concentric with the rod 3, the said rings 10 being pressed between the head 11 on a sleeve 12 surrounding the rod 3 and a ring 13 screwed onto the end of the said sleeve 12. The head 11 and the ring 13 engage respectively in the slots 14 and 15 formed in the arms 1 and 2, the said slots enabling the said head 11 and ring 13 to be disengaged when the reduced portion 5 is inside the hole 4 in the arm 2. A longitudinal groove 16 formed in the sleeve 12 allows for the passage of the pins 8, while preventing any relative rotative movement between the sleeve 12 and the rod 3. When the pins 8 are in the circular grooves 9, as in Fig. 1, the rod 3 is engaged in the arm 1, and the collar 6 is inside the hole 4 in the arm 2. Any longitudinal movement of the rod 3 is therefore impossible, the pins 8 engaged in the said grooves 9 opposing such movement, and any transversal movement of the said rod is also impossible, since the rod 3 is engaged in the arm 1 and since the collar 6 is larger than the width of the slot 7. The rod is therefore locked in this position.

Each of the rings 10 is provided on its inner face with a longitudinal groove 17 terminating in the circular groove 9. When the rings 10 are rotated so as to bring all the grooves 17 into line with each other and with the pins 8, the handle 18 mounted on the end of the rod 3 can be grasped and withdrawn to the position indicated in Fig. 2, so that the pins are moved out of the grooves 9; that the right hand end pin abuts against the ring 13; that the end of the rod 3 disengages the arm 1 and that the reduced portion 5 enters the hole 4 of the arm 2 opposite the slot 7. At this moment it is only necessary to grasp the entire locking device and to pull it sideways. The reduced portion 5 of the rod 3 will then pass into the slot 7 and the head 11 as well as the ring 13 will slide into the slots 14 and 15 in the arms 1 and 2. The rod 3 and the entire locking device will thus be disengaged from the arms 1 and 2.

To enable the correct positions of the rings 10 to be recognized so as to place all the grooves 17 in line with each other, each of said ring is provided with an outer ring 19 bearing upon its external face a number of letters, figures or any other characters, and on its inner face a set of longitudinal grooves 20 corresponding in number to that of the characters, each of the said grooves 20 corresponding to one of the said characters. Each external ring 19 can be positioned on its corresponding ring 10 by engaging one of the grooves 20 on the key 21 provided on each ring 10. When the pins are in the position shown in Fig. 2, the external rings 19 can be passed onto the rings 10 and positioned on the latter so that the letters, figures, characters, between the marks 22 formed in the head 11 and the ring 13, will form a word, a number or a combination known only to the owner of the locking device. When the rod 3 is pushed home, the left hand pin 8 abuts against the head 11 and all the pins enter the circular grooves 9. By rotating the external rings 19 the inner rings 10 are correspondingly rotated by means of the keys 21, the word, the number or the combination is jumbled and the grooves 17 assume indetermined positions. When it is desired to disengage the rod 3 from the arms 1 and 2 and bring the grooves 17 into line with each other, it is only necessary to rotate the external rings 19 so as to form again the chosen word, number or combination along the line between the marks 22. Any number of external and inner rings 19 and 10 respectively can be used.

If all the parts of the lock were accurately made, when the device is locked a pull on the handle 18 in the direction of the arrow f would cause all the pins 8 to come simultaneously into contact with the abutting faces 23, 24, 25, 26, in the successive rings 10. However, when comparatively inexpensive articles are manufactured in series, it is not possible to execute them with perfect accuracy and it generally happens that the distances between the pins 8 are not identical with the distances between the abutting faces 23, 24, 25, 26. As a result, when the handle 18 is pulled in the direction of the arrow f, only one of the pins 8 will at first come to a bearing against the corresponding abutting face, the other pins remaining a short distance away from their abutments. For example, if the third pin 8 from the left is the first pin to come to a bearing against its abutting face 25, a certain resistance would be encountered when rotating the external ring 19 and the ring 10 corresponding to the said abutting face 25, on account of the contact between the pin and the said face, whereas the other rings could be freely rotated without any resistance. If the rings 19 and 10 corresponding to the face 25 are rotated, a position in which the ring 19 turns without offering any resistance, will be found by trial. In this position, the pin 8 is opposite the longitudinal groove 17. It is then only necessary to pull the handle 18 in the direction of the arrow f, and the pin 8 corresponding to the abutting face 25 will enter the groove 17, locking the external ring 19 and the ring 10; and another pin 8 will come to a stop against its corresponding abutting face, for example, the first pin against the abutting face 23. By trial, rotating the first ring as above explained for the third ring the first pin can be made to coincide with the longitudinal slot 17 of the first ring 10, and the rod 3 with the pins 8 can again be moved until a third pin abuts against its corresponding abutting face. By operating in a similar manner with the remaining two free external rings, all the longitudinal slots will be brought into alinement with each other and since a free passage will thus be provided for the pins 8, it will be possible to withdraw the rod 3. It will therefore be seen that, in this case, an ill-intentioned person can form the combination by trial and unlock the device.

In order to avoid this disadvantage, each of the abutting faces 23, 24, 25 and 26 of the rings 10 is provided with a circular set of notches 27 acting as dummy grooves 17. These notches 27 are preferably of the same cross section as that of the groove 17. If with the rings 10 so modified, attempts are made to unlock the device as above explained, the pin 8 first coming into contact with its abutting face will encounter many points 27 at which the resistance disappears, and there will be many more chances that the pin enter a notch or dummy groove 27 than the longitudinal groove 17. Even assuming that one of the pins be brought into one of the longitudinal grooves, abnormal luck would be required in order that all the pins might be brought into the different longitudinal grooves. It is only necessary that one of the pins be in one of the notches or dummy grooves 27 for the device to remain locked. Therefore the provision of the set of notches avoid practically all possibility of the device being unlocked by unauthorized persons.

It will be evident that the application of the said set of notches is not limited to the single example illustrated, but can be used on any combination locking device based on a similar principle. However, such applications enter within the scope of the invention.

I claim:

1. A locking device comprising in combination, a stationary member provided with a hole, a stationary member provided with a hole and a reduced lateral slot, a rod adapted to slide in the holes and provided with a reduced portion adapted to pass through the lateral slot of the second mentioned stationary member, a combination device associated with said rod and adapted to be inserted between the said stationary members, and means on the rod to limit its axial movement to the opened and closed position.

2. A locking device comprising in combination two stationary members provided with corresponding holes, one of said members also having a laterally opened slot, a removable sleeve fitting between the members, a rod inserted in said sleeve, said rod having a limited axial displacement and parts respectively adapted to slide in the holes, and to pass in the laterally opened slot, and means in the sleeve to retain the rod in the position of engagement and in the position of disengagement.

3. A locking device comprising in combination two stationary members provided with corresponding holes, one of said members also having a laterally opened slot, a rod slidable in the holes, a reduced portion on the rod, a sleeve surrounding the rod in the space between the stationary members, transversal pins in the rod and rotatable rings on the sleeve, said pins and rings being combined so as to allow for a limited axial movement of the rod and means on the rod to move same either in the position of engagement or in the position of disengagement.

4. A locking device comprising in combination two stationary members provided with corresponding holes, one of said members also having a laterally opened slot, a rod slidable in the holes, a reduced portion on the rod, a sleeve surrounding the rod in the space between the stationary members, transversal pins in the rod and rotatable rings on the sleeve, an extension on the rod at the side of the laterally opened stationary member, the said pins and rings being combined so as to allow the reduced portion of the rod to move opposite the lateral slot when the rings are placed in predetermined relative positions.

In testimony whereof I affix my signature.

LOUIS ROUANET.